Patented Aug. 1, 1950

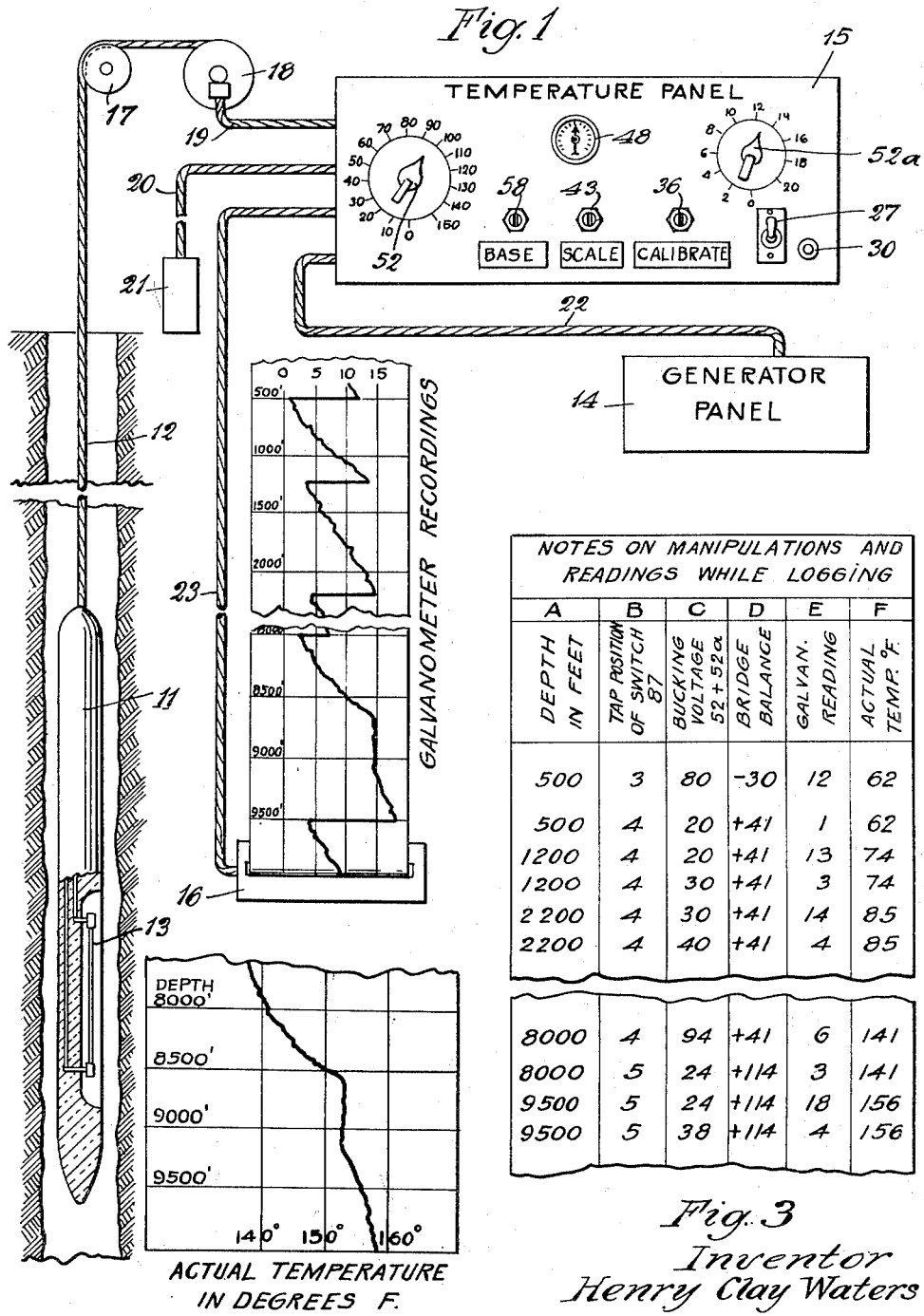

2,517,455

UNITED STATES PATENT OFFICE 2,517,455

TEMPERATURE RECORDER

Henry Clay Waters, Houston, Tex., assignor to Halliburton Oil Well Cementing Company, Duncan, Okla.

Application December 26, 1944, Serial No. 569,760

9 Claims. (Cl. 73—362)

This invention relates to electrical temperature recorders, and more particularly to a system adapted to record variations in temperature in a bore hole such as an oil well.

The recording of temperatures in an oil well or the like is useful in obtaining what is called a temperature log of the well. If such a log is made immediately after the well has been cemented, it is indicative of the height to which the cement has risen around the casing. If the temperature log is run at other times it may furnish some information as to geological conditions in the well. Temperature recording apparatus is thus capable of a variety of applications and is now commonly used in the oil fields.

In the use of electrical systems employing recording galvanometers for making temperature logs, difficulty has been experienced due to inaccuracy in measurement and due to the distance through which the variations in electrical current caused by variations in temperature, have to be transmitted, the circuits developing what is referred to as "noise" which consists in interference or spurious variations in the recording galvanometer not caused by variations in temperature.

It is an object of the present invention to devise an electrical temperature recording system for use in bore holes in which provision is made for eliminating inaccuracies and in which variations due to this interference are largely eliminated.

It is a further object of the invention to devise a novel electrical temperature recording system in which provision is made for adjusting and calibrating the recording system quickly and accurately without subjecting the temperature responsive element thereof to any given temperature, the adjustments and calibration being effected on the basis of known constants in the circuit so that accurate readings can be attained in the field with a minimum of inconvenience.

Other objects and advantages reside in certain novel features of the electrical system as will be apparent from the following description taken in connection with the accompanying drawing, in which:

Figure 1 is a diagram of electrical apparatus incorporating the principles of the present invention and showing the temperature responsive element of the system which is lowered into the well bore partially cut away to illustrate the construction;

Figure 2 is a chart illustrating the temperature variations in a well, the data for such a chart being obtained from the graph produced by the recorder of Figure 1;

Figure 3 is a typical memorandum of adjustments made upon the apparatus of Figure 1 during a temperature logging operation, together with a record of the temperatures at certain depths.

Figure 4:
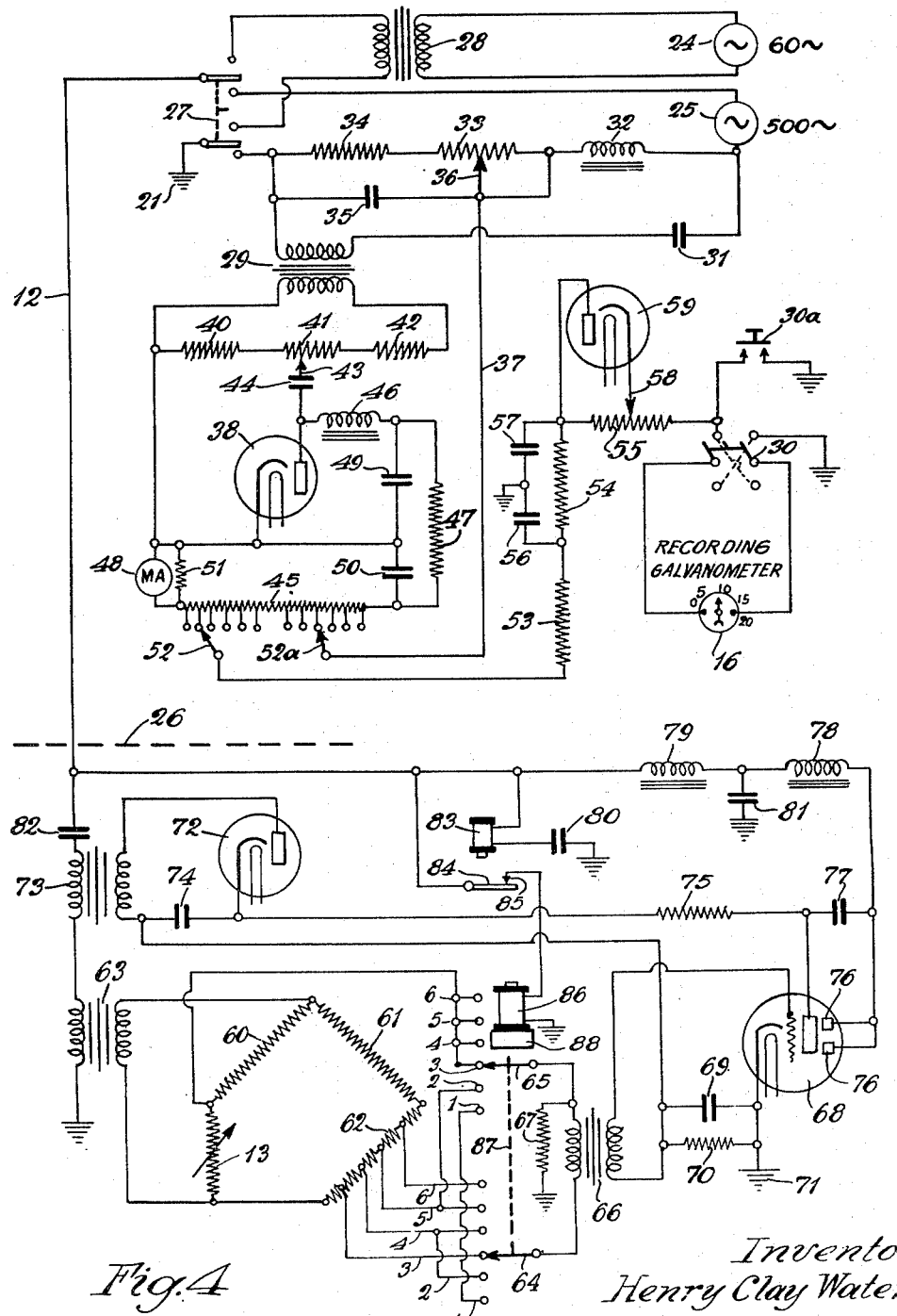
Figure 4 is an electrical circuit diagram of the apparatus of Figure 1.

Referring to the drawing in detail, it will be seen that the apparatus includes a body 11 adapted to be lowered into a well upon a single conductor electrical cable 12. The body 11 has a temperature resistance element 13 incorporated therein, this constituting one leg of a Wheatstone bridge which together with other electrical apparatus is mounted in the body 11. Electrical energy is supplied to the apparatus in the body 11 through the cable 12 from a generator panel 14 which includes two sources of alternating current of different frequencies. Electronic apparatus is provided in the body 11, which, in response to variations in resistance of the Wheatstone bridge in the body 11, causes variations in direct current in the conductor of the cable 12. These are picked up by electrical apparatus incorporated on a temperature panel 15 at the surface of the ground, and are recorded by a recording galvanometer 16 of known construction.

In Figure 1 the electrical cable is diagrammatically illustrated as coming out of the well and passing over a sheave 17 and onto a reel 18. Electrical connection from the temperature panel to the conductor of the cable 12 is made through a cable 19 and connection is made to the ground from the temperature panel by means of a cable 20 fastened to a plate or electrode 21 which may be placed in the slush pit at the well. As shown, the temperature panel 15 may be connected to the generator panel 14 by a multiple conductor cable 22, and provision is likewise made for connecting the temperature panel to the recording galvanometer by means of a cable 23.

In the electrical circuit diagram of Figure 4, the essential parts of a system constructed in accordance with the invention are illustrated, although the apparatus here shown is less complex than that actually constructed and employed in the field. Thus, the sources of alternating current illustrated at 24 and 25 are merely marked "60-cycle" and "500-cycle," respectively, without showing the details of the apparatus for generating such currents, and the recording galvanometer 16 is illustrated as consisting merely of an indicator, whereas in actual practice a film-recording vacuum tube voltmeter is used.

In the circuit diagram of Figure 4 the dash line 26 represents the surface of the ground.

Everything above this line is mounted either in the generator panel, the temperature panel or the recording galvanometer, while everything below this line represents electrical apparatus mounted within the body 11 which is lowered into the well on the cable 12.

The arrangement is such that either of the sources 24 or 25 may be connected across the conductor of the cable 12 and the ground 21 by means of a double-pole, double-throw switch 27, two of the terminals of this switch being connected to the 60-cycle source 24 through a transformer 28 while the other two terminals are connected to the 500-cycle source 25. The 500-cycle circuit includes the primary of a transformer 29 and a condenser 31 connected in series with each other. The condenser 31 is so designed as to pass alternating current of a frequency of 500 cycles, but will, of course, not transmit direct current. In parallel with the primary of transformer 29 and condenser 31, there is a circuit for passing direct current. This consists of a choke coil 32 connected in series with resistors 33 and 34. A condenser 35, connected across resistors 33 and 34, serves to reduce the flow of pulsations of current in the resistors 33 and 34.

As shown, the resistor 33 is provided with an adjustable contact 36 so connected as to short out a portion thereof so as to vary its effective resistance. A conductor 37 connected to the contact 36 provides means for transmitting direct current signalling voltage impressed on the temperature panel from the cable 12 in the well, to the recording galvanometer 16.

The temperature panel contains a control system for modifying the signal on the conductor 37 to facilitate the recording thereof by the galvanometer 16. This includes a vacuum tube rectifier 38 and associated apparatus for generating a direct current bucking voltage which is so connected to the conductor 37 as to oppose the direct current signal voltage coming up the cable 12.

The transformer 29 mentioned above supplies alternating current from the 500-cycle source 25 to the control system. The secondary of this transformer is connected to three resistors in series, these being designated 40, 41 and 42. An adjustable contact 43 is connected to the resistor 41 so as to provide means for taking off a variable alternating current voltage therefrom. The cathode of the rectifier tube 38 is connected to the outer terminal of the resistor 40 while the plate of this tube is connected through a condenser 44 to the adjustable contact 43.

In the diagram no means is illustrated for heating the filament of the tube 38, it being understood that the filament of this tube, as well as the filaments of the other tubes in the circuit, are heated by any convenient means. In actual practice, the filaments for the tubes in the apparatus at the surface of the ground are heated continuously by the 60-cycle source 24, while those in the body 11 are heated by the 500-cycle source 25, the source 25 being connected to the cable 12 at the time when temperature measurements are being made.

The output or plate circuit of the tube 38 is connected to a tapped or "decade" resistor 45, the circuit including a choke coil 46, a resistor 47, and a milliammeter 48. Only direct current is intended to flow in this circuit. To reduce the flow of pulsations or alternating current in this circuit, condensers 49 and 50 are connected across the resistor 47 and the midpoint between these condensers is connected to the cathode of the tube 38. In accordance with usual practice a shunt resistor 51 may be connected across the milliammeter 48.

An important feature of the present invention resides in the provision of means for causing the recording galvanometer 16 to read zero when there is no temperature signal in the cable 12.

Two wiper contacts 52 and 52a provide means for engaging the various taps on the resistor 45. The conductor 37 is connected to contact 52a and the galvanometer to contact 52. Assuming no current flow through the resistor 45, the direct current voltage between the contact 52 and the ground is the differential voltage between that of the direct current signal voltage in the conductor 37 and that of the bucking voltage impressed upon the resistor 45 between the contacts 52 and 52a by the control system connected in opposition to the signal voltage in the conductor 37.

The circuit connected to the recording galvanometer 16 includes resistors 53, 54 and 55, and a double-pole reversing switch 30, one terminal of which is grounded. Condensers 56 and 57 are connected across resistor 54 and the midpoint between these condensers is grounded, this arrangement serving to remove pulsations from the galvanometer circuit. The resistor 55 is provided with an adjustable contact 58 which is connected to the cathode of a vacuum tube 59, the plate of which is connected to one terminal of the resistor 55. The vacuum tube 59 serves to impress a small direct current voltage across a portion of resistor 55. The purpose of this is to adjust the galvanometer 16 to cause it to read zero when there is "zero signal input," that is, when there is no temperature signal in the cable 12. Such an adjustment is necessary because of the use of electronic vacuum tubes in the body 11 which, due to thermionic emission of electrons therein, impress a small voltage on the cable 12 even when there is no voltage impressed on the cable by the temperature responsive means in the body 11. This small voltage due to thermionic emission is called "zero base" or "static" voltage and is bucked out or "matched" by movement of adjustable contact 58 (designated "Base" in Figure 1) before any other adjustments are made in operating the system.

By the use of a shorting push-button switch 30a, all of the input signal to the recording galvanometer can be shorted to ground so that the exact zero position of the galvanometer can be observed. With all the signal shorted to ground there is zero signal into the galvanometer, consequently, the zero position of the galvanometer can be found and set to any predetermined position on the film. After switch 30a is released, a thermionic emission voltage is impressed upon the galvanometer which causes a certain amount of deflection before any temperature signal voltage from the body 11 is impressed on the cable 12. The galvanometer is returned to the zero position by adjusting contact 58 on resistor 55 and thus the galvanometer then reads zero for a zero temperature signal voltage in the cable 12.

The apparatus which is mounted in the body 11 lowered into the bore hole consists essentially of an alternating current Wheatstone bridge one leg of which is provided with taps, an alternating current amplifier for amplifying the output of the bridge, a rectifier for converting the output of the amplifier into direct current which is sent back up the cable 12 as a signal, and a switching arrangement for making contact with various taps on the bridge, the switching being effected by manipulation of apparatus at the surface of the ground.

The alternating current Wheatstone bridge is illustrated as consisting of three resistors 60, 61 and 62, connected to the temperature responsive element 13. The resistors 60, 61 and 62 are made of material which varies very little with changes in temperature, while the temperature responsive element 13 is made of platinum or other material which is highly responsive to changes in temperature. As shown in Figure 1, the temperature responsive element 13 is so mounted on the body 11 as to be exposed to mud or other fluid in the well bore. This element should not be in electrical contact with the mud in the bore hole, however, and is preferably coated with lacquer or varnish to electrically insulate it from the fluid in the well, without being heat insulated from the well fluid.

To energize the Wheatstone bridge the secondary of a transformer 63 is connected to its supply terminals, the primary of which is connected to the conductor of the cable 12 and to ground. When temperature measurements are being recorded the 500-cycle source 25 is connected to the cable by the switch 27 so that the Wheatstone bridge is energized by current of this frequency.

The resistor 62 of the bridge is provided with a number of taps. In the drawing these are illustrated as being four in number and these are marked 3, 4, 5 and 6. As shown, connection to any one of the taps can be made by one blade 64 of a double-pole, multiple-throw switch 87. The switch 87 is shown as having two blades 64 and 65 connected to the primary of a transformer 66, the circuit also including a resistor 67 connected to ground, the purpose of which is to keep the primary of transformer 66 at ground potential; thereby permitting any stray capacity currents in the bridge circuit to return to the ground without having to enter the amplifier circuit.

The contacts marked 1 of the switch 87 are connected to each other. When the blades 64 and 65 engage these contacts, the primary of the transformer 66 is short-circuited. Adjustments of the circuit may then be made under conditions when there is no output from the alternating current bridge, this position being what is referred to above as "zero signal input."

When the blades 64 and 65 engage their contacts marked 2, a predetermined portion of the alternating current voltage from the source 25 is impressed across the primary of transformer 66, the contacts marked 2 being connected to a fixed portion of the resistor 62. Since the resistor 62 is connected in parallel and not in series with the leg of the bridge which contains resistor 13, the voltage across the portion connected to contacts 2 depends only upon the voltage applied to the transformer 63. There is thus provided a circuit for calibrating the system on the basis of a predetermined voltage output from the bridge, which output voltage depends only upon the constants of the circuit. This output voltage corresponds to that output voltage from the Wheatstone bridge which would prevail when some predetermined temperature existed on the temperature responsive element 13. In other words, a voltage which produces a signal voltage comparable to that produced by some known temperature can be impressed across the primary of transformer 66 before the bridge is used to measure temperature. The manner in which this arrangement is used to calibrate the system will be described hereinafter.

The upper set of contacts marked 3, 4, 5 and 6 of the switch 87 are all connected together and to one of the signal terminals of the bridge, while the lower set of contacts similarly numbered are connected to the taps (likewise similarly numbered) of the resistor 62. The contacts 3, 4, 5 and 6 are used when temperature is being measured, the position of the blades 64 and 65 thereon serving to vary the bridge balance as the resistance of element 13 varies.

The secondary of the transformer 66 is connected to the cathode and grid of a vacuum tube 68 which serves both as an alternating current amplifier and as a rectifier. This circuit includes a condenser 69 and a resistor 70, the latter being grounded as shown at 71. The plate supply to the tube 68 is provided by means of an auxiliary rectifier tube 72 connected to the secondary of a transformer 73 fed by 500-cycle current passing through the cable 12.

The plate supply circuit for the tube 68 includes a condenser 74 which serves to reduce the flow of direct current pulses in the output from the tube 72. Resistor 75 is the load resistor for the triode amplifier in tube 68. The amplified alternating current signal from the triode in tube 68 is capacity coupled by means of condenser 77 to a diode which is also contained in tube 68. The diode consists of the plate elements 76 and the cathode of the tube 68. The alternating current amplified signal is rectified in the diode and connected through the choke coils 78 and 79 to the conductor of the cable 12. A condenser 81 is connected between the midpoint of the choke coils 78 and 79 to the ground to remove alternating current variations from the circuit.

It will be observed that a condenser 82 is in the circuit between the conductor of the cable 12 and the transformers 63 and 73 so that the direct current signal voltage fed into the conductor of the cable 12 is not grounded out through the primaries of these transformers. The circuit from the cable 12 which contains the condenser 82 and the primaries of transformers 63 and 73 may thus be said to constitute a selective circuit for causing current from the 500-cycle source 25 to supply the Wheatstone bridge.

Thus, the arrangement is such that the direct current signalling voltage may flow through the single conductor of the cable 12 at the same time that 500-cycle alternating current is flowing through this conductor from the source 25 to energize the alternating current bridge in the body 11 and also to supply energy to the amplifier-rectifier system in the body 11.

When it is desired to manipulate the switch 87 in the body 11, the switch 27 on the temperature panel at the surface of the ground is manipulated to connect the 60-cycle source 24 to the cable and disconnect the 500-cycle source 25. When the 60-cycle source is connected to the cable, current flows to ground through a high impedance coil 83 mounted in the body 11. The circuit of this coil includes a condenser 80 and the characteristics of this circuit are such that it also is selective. The 60-cycle current will flow through the coil 83, whereas no direct current will flow through it, and not enough 500-cycle current will flow through it to actuate the armature 84 associated with the coil 83. When the coil 83 is energized by 60-cycle current, the armature 84 moves to close a microswitch 85 connected to the conductor of the cable 12 and to a low impedance solenoid 86 which operates a pawl of ratchet mechanism 88 in such a manner as to advance the switch 87 one step. The mechanism for accomplishing this being conventional, it is not shown here other than diagrammatically. Thus, every time that the switch 27 on the temperature panel is manipulated to send 660-cycle current through the cable 12 the blades 64 and 65 of the switch 87 are advanced from one contact to the next. It will be understood that the blades move from contacts 6 to contacts 1 so that the cycle of operation can be carried on as many times as desired.

The apparatus described above may be operated as follows:

The body 11 is placed in the well bore and lowered to the depth therein where it is desired that the temperature logging shall begin, the log being made as the apparatus is lowered farther into the well. The two sources 24 and 25 are presumed to be functioning to generate voltages suitable for logging and it is, of course, assumed that proper connection to the ground has been made with the electrode 21 at the surface of the ground.

Before any logging is done, three adjustments are made, these being referred to as (1) "Base," (2) "Scale," and (3) "Calibrate" and they are so marked on the temperature panel of Figure 1.

(1) The first operation consists in adjusting the contact 58 for base or zero signal input, i. e. the galvanometer is made to read zero when the input to the alternating current signal amplifier in the body 11 is zero. As indicated above, this requires that the switch 87 be manipulated so that the blades 64 and 65 engage the contacts 1. To bring this about, the switch 27 is manipulated as many times as may be required to move the blades to the contacts 1, this position being indicated at the surface by a minimum deflection of the galvanometer 16. When the blades 64 and 65 engage the contacts 1 the adjustable contact 58 (marked "Base" on the temperature panel) is adjusted until the galvanometer reads zero. The needle of the galvanometer should then not move whether the switch 30a is closed or not, since all the direct current signal is bypassed to ground when this switch is closed. The switch 30a thus serves to check the zero reading of the galvanometer.

(2) The next step involves a scale adjustment of the control system on the temperature panel with respect to the galvanometer. With the blades 64 and 65 of the switch 87 still on the contacts 1 so that there is no signal coming up the cable due to temperature, a predetermined voltage is impressed across the contacts 52 and 52a to cause the galvanometer 16 to move to its full scale position. In Figure 1 of the drawing the full scale deflection of the recording galvanometer is shown as 20 degrees of temperature. The recording portion of the galvanometer is unidirectional and since the bucking voltage generated on the temperature panel is negative with respect to the signal voltage coming up from the cable 12, some provision must be made for reversing the polarity of the connections to the galvanometer when the control system on the temperature panel is being adjusted with respect to the galvanometer. A reversing switch such as illustrated at 30 may be used for this purpose. It is thrown to reverse position so that the bucking voltage causes the galvanometer to deflect.

The contacts 52 and 52a which engage the taps on the resistor 45 are provided with scales which indicate degrees of temperature. Thus, as shown in Figure 1, the contact 52 is provided with a scale marked in degrees from 0 to 150 at ten degree intervals, while the contact 52a is provided with a scale from 0 to 20 in two degree intervals. Accordingly, to correlate the scales of contacts 52 and 52a of the control system of the temperature panel with respect to the scale of the recording galvanometer the contacts 52 and 52a are placed to indicate 20 degrees of temperature. Since these contacts are in series, the IR drop across resistance 45 is proportional to the sum of their scale readings. Thus the contact 52 may be placed on the numeral 10 on its scale and the contact 52a may be placed on the numeral 10 on its scale to give a total reading of 20. The bucking voltage impressed between these two contacts should then cause the galvanometer to deflect full scale or indicate 20 degrees of temperature. If it does not do so, the contact 43 (marked "Scale" on the temperature panel) is adjusted to vary the bucking voltage emitted by the tube 38 to cause the galvanometer to deflect full scale or indicate 20 degrees of temperature when the contacts 52 and 52a indicate a bucking voltage corresponding to a total reading of 20 degrees on their scales.

(3) Assuming that the control system at the surface is now adjusted, the next step consists in calibrating the apparatus in the body 11 with respect to that on the temperature panel. Reversing switch 30 is placed in its normal or original position so as to cause the galvanometer to deflect in response to the signal voltage coming up the cable 12. Switch 27 is operated once to cause the blades 64 and 65 of the switch 87 to engage the contacts 2. A predetermined portion of the resistor 62 is now connected to the primary of the transformer 66 and a direct current voltage from the body 11 is impressed on the conductor of the cable 12 which causes current to flow from that conductor through the alternating current source 25, the choke coil 32 and the resistors 33 and 34 to the ground at 21, thus impressing a portion of this direct current voltage upon the conductor 37.

Before sending the temperature logging apparatus into the field, a test is made to determine what temperature on the temperature responsive element 13 will impress a voltage on the primary of the transformer 66 when the blades 64 and 65 are engaging the contacts 2, if the contacts 52 and 52a are adjusted so that the total of their scales read 70 degrees. The recording galvanometer 16 should then read zero, it being understood that the galvanometer functions only to record the difference in voltage between the bucking voltage generated by the control system on the temperature panel and the signal voltage created in the body 11 and impressed upon the conductor 37. If the recording galvanometer does not read zero under these conditions, the contact 36 on the resistor 33 (marked "Calibrate" on the temperature panel) is adjusted until the galvanometer does read zero. The apparatus is then in condition for running the temperature log.

Since the temperatures in the well bore will normally vary more than 20 degrees, it is obvious that adjustments in the circuits will have to be made to keep the galvanometer on scale. Within limits, the galvanometer may be brought approximately on scale by manipulation of the contacts 52 and 52a on the decade resistor 45, but if these limits are exceeded, more adjustments are necessary to attain the required accuracy. It is a characteristic of a Wheatstone bridge that it is accurate only when nearly balanced. Likewise all tubes have a definite range over which they operate linearly. If this range is exceeded, the response signal becomes non-linear. Consequently, the input signal should be kept within definite limits. This is accomplished by operating the bridge close to the balance point. Secondly, it is desirable to keep the total signal input to the amplifier as low as possible from the standpoint of "noise." The lower the total signal, the less interference there will be. For example, if the system is operated at a 10 degree signal level, and the interference is one per cent of the total signal, the interference level is one-tenth of one degree, which is not objectionable. On the other hand, if the system is operated at 200 degrees signal level, and the interference is one per cent of the total signal, a "noise" level of two degrees results and this is highly objectionable. To increase the accuracy of the system, therefore, variable taps on the resistor 62 are provided together with the switch 87 for making connection to these taps.

In analyzing a temperature log made with the system, it should be borne in mind that the galvanometer records in degrees Fahrenheit the difference between the signal voltage on the conductor 37 and the bucking voltage generated on the temperature panel and that the magnitude of the bucking voltage necessary to completely buck out the signal voltage coming up the cable 12 depends upon the particular tap of the resistor 62 to which the switch blade 64 is connected. In operating the apparatus a record should be kept at all times of the position of the switch 87 and of the readings of the decade contacts 52 and 52a. For purposes of showing how the system is operated, simulated records are illustrated in Figures 1, 2 and 3 of the drawing. In these figures, it is assumed that the body 11 is lowered to a depth of 500 feet in the well before the temperature log is begun. With the switch 87 manipulated to cause the blades 64 and 65 to engage contacts 3, and with the decade contacts 52 and 52a adjusted to read a total of 80 degrees, the galvanometer reads 12 degrees (see chart of Figure 1 opposite level of 500 feet). The Wheatstone bridge may be so designed that when the switch 87 is engaging contacts 3 the bridge is completely balanced when the temperature responsive element 13 is exposed to a temperature, say, of minus 30 degrees Fahrenheit, the operator knowing this constant before the making of the log is begun. The actual temperature to which the temperature responsive element 13 is exposed is the algebraic sum of the constant of the bridge balance (in this case minus 30 degrees), the reading on the decade contacts 52 and 52a (in this case 80 degrees), and the reading of the galvanometer, namely, 12 degrees or in other words, 62 degrees Fahrenheit. All of these values are accordingly marked on the top line of the record of Figure 3.

In making the readings mentioned in the previous paragraph it will be seen that the bridge is considerably off balance, the actual temperature of the temperature responsive element 13 being 92 degrees higher than the temperature at which the bridge would be in complete balance with the switch 87 on contacts 3. It is therefore desirable to bring the bridge nearer to an actual balance point. Accordingly the switch 27 is depressed once to cause the switch 87 to engage contacts 4. The operator may not know the constant of the bridge which is indicative of the temperature at which the bridge would be fully balanced with the switch 87 on the contacts 4, but he does know that the temperature to which the element 13 is exposed is 62 degrees at a depth of 500 feet in the well. If he finds that adjustment of the decade contacts 52 and 52a to the position where the temperature there indicated is 20 degrees while the galvanometer reading is 1 degree, as shown in Figure 1, after switch 27 has been manipulated, he then knows that the constant of the bridge when the switch 87 is on position 4 is plus 41 degrees and can accordingly fill in the second line of the chart of Figure 3.

Assuming that as the body 11 is lowered down the well the temperature gradually increases, the record shown in Figure 1 below the depth of 500 feet is obtained. When a depth of 1,200 feet is reached the operator decides that a greater bucking voltage should be employed and accordingly he adjusts the contact 52 from the position on its scale reading 20 to a position reading 30, the galvanometer reading accordingly dropping from 13 to 3. Similarly, when a depth of 2,200 feet is reached contact 52 is adjusted from a position on its scale reading 30 to a position reading 40 and the galvanometer reading dropping from 14 to 4. Thus the galvanometer is kept on scale. Similar adjustments are made until at a depth of 8,000 feet the operator deems that the bridge is now again sufficiently far off balance as to be approaching the point of undesirable inaccuracy in operation. He accordingly manipulates the switch 27 to cause the switch 87 to advance to contacts 5. In order that the constants of the bridge with the switch in that position may be determined or checked, readings at the same depth are made with the switch 87 in both positions 4 and 5 and the data recorded. As the body 11 is lowered on down into the hole a further adjustment of the decade contacts 52 and 52a is made as illustrated, at a depth of 9500 feet on the chart of Figure 3 of the drawing.

After the log is made, a chart of actual temperature is drawn by transcribing from the chart obtained from the recorder 16. A portion of such a temperature chart is shown in Figure 2 of the drawing.

Small voltage changes of the 500-cycle source 25 are hardly noticeable on the log due to the compensating nature of the temperature signal voltage and the bucking voltage. It will be observed that the same source 25 is used to supply energy to the control system on the temperature panel and to the Wheatstone bridge in the body 11. Therefore, change in one causes a similar change in the other. This condition holds true over a rather wide range of voltage of the source 25. However, the voltage of the generator 25 should be observed at the beginning of the making of the log and also the reading of the milliammeter 48 on the temperature panel. While logging, these values should be observed periodically to see if the generator 25 is performing properly. After the log is completed the equipment should be calibrated again to make sure that it has operated properly.

While only one embodiment of the invention has been shown and described herein, it is obvious that various changes may be made in the arrangement without departing from the spirit of the invention or the scope of the annexed claims.

I claim:

1. An electrical device for logging temperatures in oil wells or the like, comprising a single conductor cable, electrical apparatus adapted to be located at the surface of the ground near the well, and a body adapted to be lowered into the well on the cable, said electrical apparatus located at the surface of the ground including an electrical circuit, a recording galvanometer adapted to be connected to said circuit for recording variations therein and two sources of alternating current of different frequency either of which is adapted to be connected to the conductor of the cable, said body adapted to be lowered into the well containing an alternating current Wheatstone bridge one leg of which consists of a resistor responsive to temperature conditions in the well and another leg of which consists of a resistor provided with taps, said resistors being connected in parallel with respect to the supply terminals of said bridge, an electronic amplifier and rectifier system for impressing a direct current signal voltage on the conductor of said cable, connected to one of the signal terminals of said bridge and being provided with a switching arrangement for selectively making connection to one of said taps, a switch for selectively connecting the sources of alternating current at the surface of the ground to said single conductor cable, a selective circuit in said body for causing alternating current from one of said sources to actuate said switching arrangement and a selective circuit in said body for causing the other of said sources to supply said bridge, said switching arrangement being also selectively operable for short circuiting the input to said electronic system or for impressing a voltage thereon from two of the taps on said tapped resistor proportional to the voltage supplied to said bridge but independent of the voltage across the signal terminals of said bridge whereby the electrical circuit for the recording galvanometer can be adjusted to compensate for electronic emission from said electronic system when there is no input to said electronic system and again when there is an input to said electronic system corresponding to that impressed on said electronic system by the Wheatstone bridge when said temperature responsive resistor is subjected to a known temperature.

2. An electrical device for logging temperatures in oil wells or the like, comprising a single conductor cable, electrical apparatus adapted to be located at the surface of the ground near the well connected to the conductor of said cable, and a body adapted to be lowered into the well on the cable, said electrical apparatus located at the surface of the ground including an electrical circuit, a recording galvanometer adapted to be connected to said circuit for recording variations therein and two sources of alternating current of different frequency either of which is adapted to be connected to the conductor of the cable, said body adapted to be lowered into the well containing an alternating current Wheatstone bridge one leg of which consists of a resistor responsive to temperature conditions in the well and another leg of which consists of a resistor provided with taps, said resistors being connected in parallel with respect to the supply terminals of said bridge, an electronic amplifier and rectifier system for impressing a direct current signal voltage on the conductor of said cable, connected to one of the signal terminals of said bridge and being provided with a switching arrangement for selectively making connection to one of said taps, a switch for selectively connecting the source of alternating current at the surface of the ground to said single conductor cable, a selective circuit in said body for causing alternating current from the source of lower frequency to actuate said switching arrangement, a selective circuit in said body for causing the alternating current of higher frequency to supply said bridge, said switching arrangement being also selectively operable to impress temporarily a voltage upon said amplifier and rectifier system from two of the taps of said tapped resistor proportional to the voltage supplied to said bridge but independent of the voltage across the signal terminals of said bridge, and a control, bucking voltage system at the surface of the ground energized by said source of higher frequency for supplying a direct current voltage in opposition to the direct current signal voltage impressed on the conductor of said cable by said electronic amplifier and rectifier system.

3. An electrical device for logging temperatures in oil wells or the like, comprising a single conductor cable, electrical apparatus adapted to be located at the surface of the ground near the well, and a body adapted to be lowered into the well on the cable, said electrical apparatus located at the surface of the ground including an electrical circuit, a recording galvanometer adapted to be connected to said circuit for recording variations therein and two sources of alternating current of different frequency either of which is adapted to be connected to the conductor of the cable, said body adapted to be lowered into the well containing an alternating current Wheatstone bridge one leg of which consists of a resistor responsive to temperature conditions in the well and another leg of which consists of a resistor provided with taps, said resistors being connected in parallel with respect to the supply terminals of said bridge, an electronic amplifier and rectifier system for impressing a direct current signal voltage on the conductor of said cable, connected to one of the signal terminals of said bridge and being provided with a switching arrangement for selectively making connection to one of said taps, a switch for selectively connecting the sources of alternating current at the surface of the ground to said single conductor cable, a selective circuit in said body for causing alternating current from the source of lower frequency to actuate said switching arrangement, a selective circuit in said body for causing the alternating current source of higher frequency to supply said bridge, said switching arrangement in said body being also operable to short circuit the input of said electronic system temporarily, and a source of direct current at the surface of the ground having means for impressing an adjustable voltage on the circuit of said recording galvanometer to balance out any signal voltage coming up the cable due to thermionic emission or other phenomena in said electronic system when the input to said electronic system is short circuited.

4. In an electrical device for logging temperatures in oil wells or the like, a body adapted to be lowered into the well on a single conductor cable, said body containing an alternating current Wheatstone bridge one leg of which consists of a resistor responsive to temperature conditions in the well and another leg of which consists of a resistor provided with taps, said resistors being connected in parallel with respect to the supply terminals of said bridge, an electronic amplifier and rectifier system for impressing a direct current signal voltage on the conductor of the cable, a switching arrangement for selectively connecting the input circuit of said electronic system across one signal terminal of said bridge and some certain tap on said tapped resistor or for short circuiting the input circuit thereof, or for connecting the same to two taps on said tapped resistor, and means for operating said switching arrangement by remote control by the use of an alternating current of a different frequency than that used to supply said Wheatstone bridge.

5. In an electrical device for logging temperatures in oil wells or the like, an alternating current Wheatstone bridge adapted to be lowered into the well and adapted to have an output responsive to temperature conditions in the well, an electronic amplifier and rectifier system associated with said bridge and adapted when connected to said bridge to have a direct current signal output proportional to the output of said bridge, but having a small signal output when the output of said bridge is zero, remote control means normally connecting said electronic system to said bridge, but capable of short circuiting the input to said electronic system when desired, a direct current recording galvanometer connected to the output of said electronic system and a source of direct current of adjustable voltage connected to said recording galvanometer and adapted to balance out any signal voltage in the output of said electronic system when the input thereof is short circuited.

6. In an electrical device for logging temperatures in oil wells or the like, an alternating current Wheatstone bridge adapted to be lowered into the well and adapted to have an output responsive to temperature conditions in the well, an electronic amplifier and rectifier system associated with said bridge and adapted when connected to said bridge to have a direct current signal output proportional to the output of said bridge, but having a small signal output when the output of said bridge is zero, remote control means normally connecting said electronic system to said bridge, but capable of short circuiting the input to said electronic system when desired, a direct current recording galvanometer connected to the output of said electronic system and a source of direct current of adjustable voltage connected to said recording galvanometer and adapted to balance out any signal voltage in the output of said electronic system when the input thereof is short circuited, a source of alternating current located at the surface of the ground for supplying said bridge and a single conductor cable for transmitting alternating current to said bridge and for transmitting direct current signals from said electronic system to said recording galvanometer.

7. In an electrical device for logging temperatures in oil wells or the like, an alternating current Wheatstone bridge having a leg with taps adapted to be lowered into a well and adapted to have an output responsive to temperature conditions in the well, an electronic amplifier and rectifier system associated with said bridge and adapted when connected to said bridge to have a direct current output proportional to the output of said bridge, remote control means normally connecting said electronic system to the output of said bridge but capable of connecting the same to said taps in said leg of said bridge whereby the input to said electronic system may be fixed when desired at a predetermined value independent of the output of said bridge, a direct current recording galvanometer connected to the output of said electronic system and calibrating means at the surface of the ground for regulating the circuit of said recording galvanometer to cause the galvanometer to read at a desired value when the input of said electronic system is connected to taps in one leg of said bridge.

8. In an electrical device for logging temperatures in oil wells or the like, an alternating current Wheatstone bridge having a leg with taps adapted to be lowered into a well and adapted to have an output responsive to temperature conditions in the well, an electronic amplifier and rectifier system associated with said bridge and adapted when connected to said bridge to have a direct current output proportional to the output of said bridge, remote control means normally connecting said electronic system to the output of said bridge but capable of connecting the same to said taps in said leg of said bridge whereby the input to said electronic system may be fixed when desired at a predetermined value independent of the output of said bridge, a direct current recording galvanometer connected to the output of said electronic system and calibrating means at the surface of the ground for regulating the circuit of said recording galvanometer to cause the galvanometer to read at a desired value when the input of said electronic system is connected to taps in one leg of said bridge, a source of alternating current located at the surface of the ground for supplying said bridge and a single conductor cable for transmitting alternating current to said bridge and for transmitting direct current signals from said electronic system to said recording galvanometer.

9. An electrical device for logging temperatures in oil wells or the like, comprising a single conductor cable, electrical apparatus adapted to be located at the surface of the ground near the well, and a body adapted to be lowered into the well on the cable, said electrical apparatus located at the surface of the ground including an electrical circuit, a recording galvanometer adapted to be connected to said circuit for recording variations therein and two sources of alternating current of different frequency either of which is adapted to be connected to the conductor of the cable, said body adapted to be lowered into the well containing an alternating current Wheatstone bridge one leg of which consists of a resistor responsive to temperature conditions in the well and another leg of which consists of a resistor provided with taps, said resistors being connected in parallel with respect to the supply terminals of said bridge, an electronic amplifier and rectifier system for impressing a direct current signal voltage on the conductor of said cable, connected to one of the signal terminals of said bridge and being provided with a switching arrangement for selectively making connection to one of said taps, a switch for selectively connecting the sources of alternating current at the surface of the ground to said single conductor cable, a selective circuit in said body for causing alternating current from one of said sources to actuate said switching arrangement and a selective circuit in said body for causing the other of said sources to supply said bridge.

HENRY CLAY WATERS.

(References on following page)

REFERENCES CITED

The following references are of record in the file of this patent:

UNITED STATES PATENTS

| Number | Name | Date |
|---|---|---|
| 2,315,127 | Mounce | Mar. 30, 1943 |
| 2,414,862 | Fearon | Jan. 28, 1947 |

OTHER REFERENCES

Pages 1009 and 1010 of Temperature, Its Measurement and Control in Science and Industry, published under the auspices of the American Institute of Physics et al. by Reinhold Pub. Corp., 330 West 42nd St., New York, in 1941. (A copy of this pub. may be found in Div. 36, U. S. Pat. Off.)